United States Patent [19]

Kourtides et al.

[11] Patent Number: 5,277,959

[45] Date of Patent: Jan. 11, 1994

[54] COMPOSITE FLEXIBLE BLANKET INSULATION

[75] Inventors: Demetrius A. Kourtides, Gilroy; David M. Lowe, Los Altos, both of Calif.

[73] Assignee: The United States of America as represented by the Administrator of National Aeronautics and Space Administration, Washington, D.C.

[21] Appl. No.: 739,026

[22] Filed: Aug. 1, 1991

Related U.S. Application Data

[60] Continuation-in-part of Ser. No. 700,368, May 6, 1991, abandoned, which is a division of Ser. No. 410,576, Sep. 21, 1989, Pat. No. 5,038,693.

[51] Int. Cl.$^5$ .......................... B32B 5/26; B32B 7/08; B32B 18/00; B32B 33/00; D03D 15/12
[52] U.S. Cl. .................................... 428/116; 112/415; 112/420; 112/440; 139/420 A; 428/284; 428/332; 428/340; 428/698; 428/920
[58] Field of Search .................... 112/415, 420, 440; 428/116, 284, 332, 340, 920; 139/420 A

[56] References Cited

U.S. PATENT DOCUMENTS

| | | | |
|---|---|---|---|
| 3,007,596 | 11/1961 | Matsch . | |
| 4,401,707 | 8/1983 | Bailey et al. | 428/285 |
| 4,550,046 | 10/1985 | Miller | 428/920 |
| 5,038,693 | 8/1991 | Kourtides et al. | 428/285 |

OTHER PUBLICATIONS

Kourtides et al, *Fire Sciences*, vol. 6, Sep./Oct. 1988, pp. 313-331.

*Primary Examiner*—James C. Cannon
*Attorney, Agent, or Firm*—Darrell G. Brekke; Guy Miller; John R. Manning

[57] ABSTRACT

An improved composite flexible blanket insulation comprising top silicon carbide having an interlock design, wherein the reflective shield is composed of single or double aluminized polyamide and wherein the polyamide film has a honeycomb pattern.

19 Claims, 9 Drawing Sheets

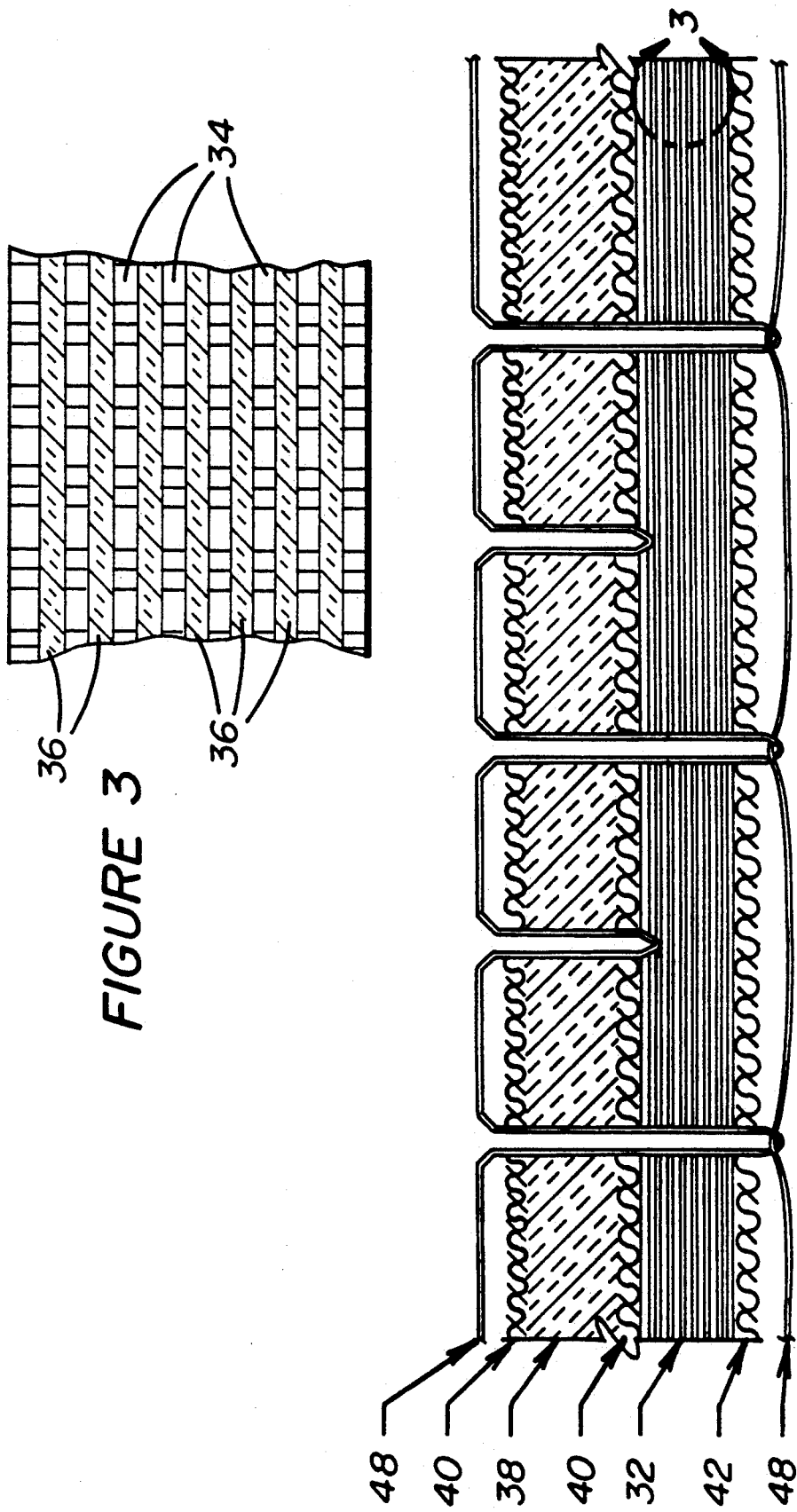

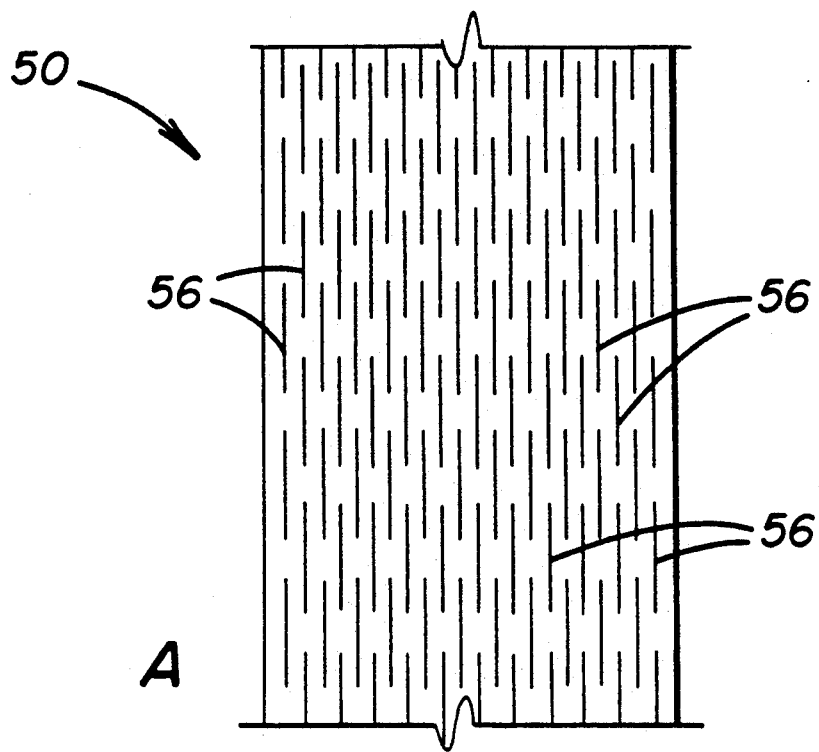
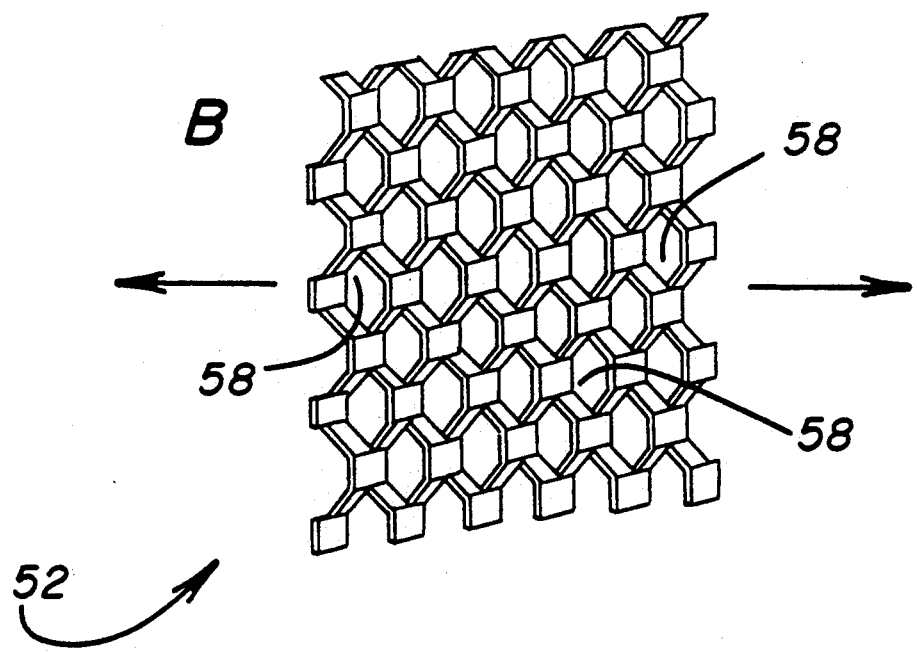
FIGURE 6

O = PICKS or FILL

⌒ = WARP and BINDER YARN

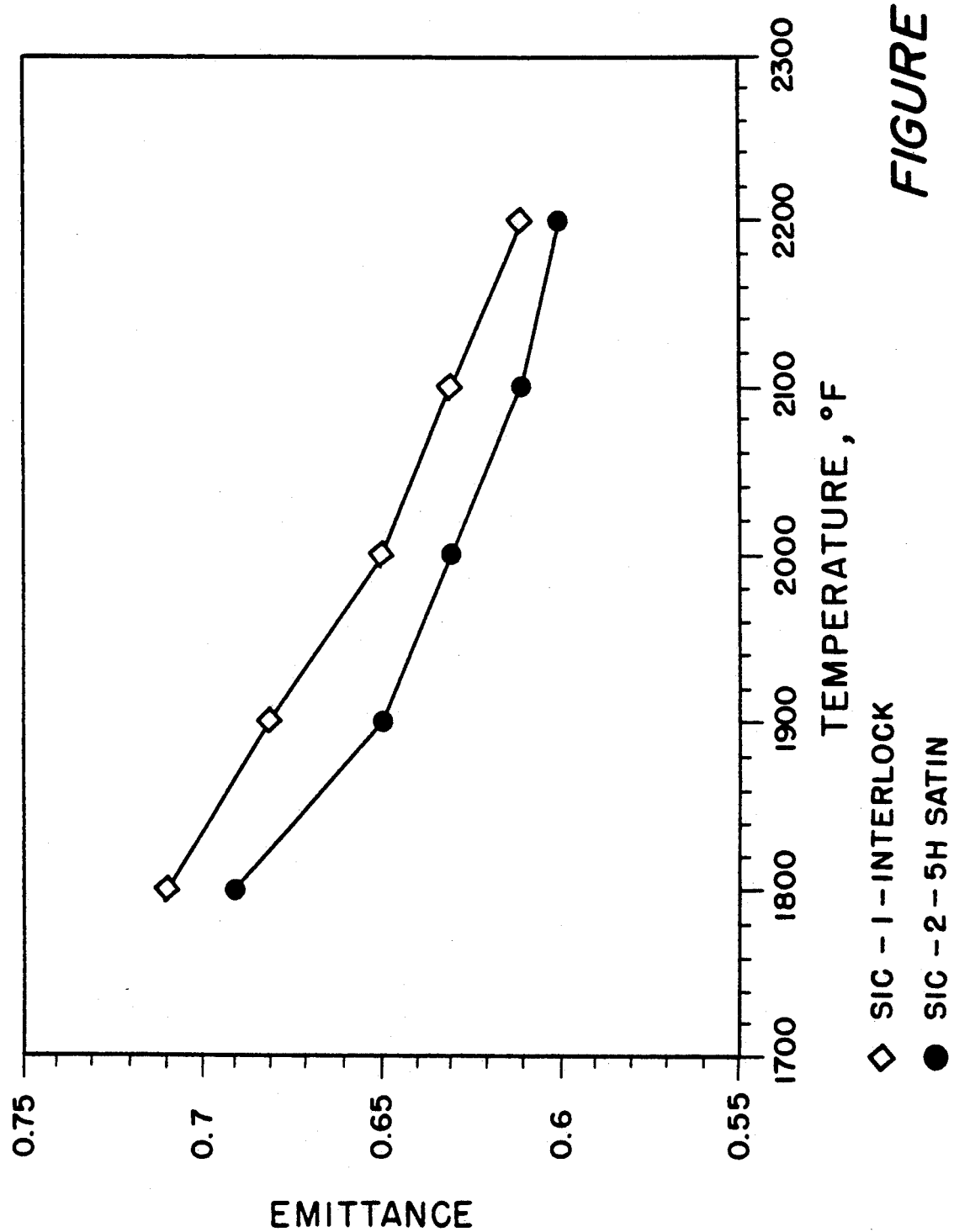

COMPOSITE FLEXIBLE BLANKET INSULATION

This application is a continuation-in-part of the U.S. application Ser. No. 07/700,368 filed on May 6, 1991, now abandoned for "Silicon Carbide Sewing Thread", which is a divisional of the U.S. application Ser. No. 07/410,576 for "Composite Flexible Blanket Insulation", filed on Sept. 21, 1989, issued as the U.S. Pat. No. 5,038,693 on Aug. 13, 1991.

BACKGROUND OF THE INVENTION

Origin of the Invention

The invention disclosed herein was made in the performance of work under a NASA contract and is subject to Public Law 96-517 (35 U.S.C. §200, et seq.). The contractor has not elected to retain title to this invention.

Field of the Invention

The present invention relates to a new and improved composite flexible blanket insulation (CFBI) useful as a thermal protection system for specific heating environments which contain conductive, convective and radiative heating components. In particular, this invention relates to CFBI comprising essentially of interlocked silicon carbide fabric and multiple alternating layers of single aluminized foil and/or honeycomb patterned foil. The blanket has high emissivity and resistance to a high heat flux and thermal insulation capability between 1450° C. and 1650° C.

The new CFBI contains three improvements: a honeycomb-patterned radiation shield or spacer, a single-sided aluminized foil radiation shield and a new interlock silicon carbide fabric. Individually and particularly when combined, these improvements result in substantial weight savings, lower thermal diffusivity and/or conductivity and a high density surface which assures the high emissivity of the CFBI.

A prime requirement for thermal protection of subjects exposed to extremely high temperatures, such as, for example, aerospace vehicles or firemen's suits and tools, are highly thermoresistant but lightweight thermal insulations. Aerospace vehicles, in particular, are subject to aeroconvective and radiative heating, launch acoustics and rain during atmospheric entry. Consequently, they require extremely efficient thermal protection as described in systems capable of protecting their metal or composite substructures from reaching temperatures above their operating limit.

Currently existing silica fibrous insulations, known as Advanced Flexible Reusable Surface Insulation (AFRSI), as described in *Ceramic Eng. Sci. Proc..* 6:793 (1985) provide reasonably good thermal protection. However, there is always a need to develop more efficient and lightweight high temperature-resistant flexible insulators.

AFRSI insulation is a quilt-like material made of two layers of silica and glass cloth interspaced with one layer of fibrous silica felt, sewn together with silica and glass threads. The AFRSI has a thickness between 1-5 cm and can withstand temperatures in excess of 650° C.

The AFRSI insulation evolved into Tailorable Advanced Blanket Insulation (TABI), described in NASA C.P. 3001: 135 (November 1987), which has a higher temperature capability and greater tolerance to aerodynamic loads than AFRSI. Although TABI is progressively more durable, its comparable thermal conductivities are of the order of $5 \times 10^{-2}$ W/meter.°Kelvin (m.K) at room temperature, at pressure of 0.01 atmosphere.

Certain improvement has been achieved with multilayer insulation (MLA) blanket, which has a much lower thermal conductivity. This MLA blanket is commonly used for thermal control within spacecraft. When the MLA blanket is combined with an all ceramic fibrous insulation, such as the AFRSI or TABI, much lower effective thermal conductivities can be achieved.

Recently, an insulation combining AFRSI and MLA into a single blanket having insulation capability between 500° C. to 1000° C. temperatures was described in *J. Fire Sci..* 6:313 (1988). This insulation consists of ceramic alumino-borosilicate fabrics (used for top and bottom surfaces), silica, aluminoborosilicate (ABS) or alumina insulations, and multilayers of stainless steel foils separated by ABS scrim, all quilted together using ceramic thread.

This type of insulation seems to be reasonably suitable for insulation at temperatures up to 800° C., however, the oxidation of stainless steel occurring after multiple heating and cooling cycles negatively effects the spectral reflectance, and therefore made this insulation impractical for repeated use at high temperatures.

Previous studies described in NASA C.P., 3001:135 (1988) have shown that silicon carbide (SiC) fabric surfaces can survive higher heating loads than silica fabric. For example, exposure to a heating rate of 37 W/cm² resulted in no observable deterioration of the SiC fabric surface, whereas a silica fabric became brittle after exposure to 10 W/cm². The higher emissivity of SiC over silica was found to be another advantage for high-temperature environments.

The currently allowed copending U.S. patent application entitled "Composite Flexible Blanket Insulation", Ser. No. 07/410,576 filed on Sept. 21, 1989, incorporated herein by reference, describes a composite flexible blanket insulation which is lightweight, durable, flexible, and reusable. The multilayer insulation is quilted together with high temperature-resistant threads. The multiple aluminum foil layers providing a radiation shield are interspaced with aluminum borosilicated scrim cloth, scrim felt or polyamide and insulated with silica or aluminoborosilicate; all of these layers are sandwiched between outer and inner surface fabrics.

Advantages of such insulation are partially described in AIAA-89: Paper 1772 (June 1989) and in a paper entitled ¢Composite Multilayer Insulations for Thermal Insulation," presented at Clemson University's Third Annual Conference on Protective Clothing on May 23-25, 1989. Development of SiC sewing thread is described in SAMPE Ouart., 3-8 (1989).

The current invention represents a substantial improvement of the CFBI as described in the 07/410,576 patent application. The main improvements concern the aluminumization and the pattern of the foil and the new design of silicon carbide fabric. It has now been found that single-sided aluminized foils exhibit lower thermal conductivity than double-sided aluminized foils, that the honeycomb technology used for aluminum foil instead of flat foil has lower thermal diffusivity and conductivity and provides a substantial weight savings, and that a certain new design of silicon carbide fabric has higher emittance than other silicon carbide fabrics.

The use of the single aluminized foil has been briefly mentioned in the copending parent application 07/410,576, however its improved performance was not recognized. The new interlock design of the silicon carbide fabric has not been previously described. The honeycomb technology is described in the U.S. Pat. No. 4,550,046, incorporated herein by reference. That patent discloses an insulating material made of one or more layers of open-ended cells, formed from flexible thin plastic sheets. The idea of using honeycomb in thermal insulations is not new. Honeycomb insulation was first used around the turn of the century in early solar water heaters. Since then, many applications have been considered but certain limitations have prohibited its widespread use, including production cost, mechanical problems of application and limitations on materials used in honeycomb construction. The use of honeycomb technology for aluminum foil such as aluminized Kapton foil (Al Kapton), and incorporation of such honeycomb-like patterned aluminized foil in multilayered insulation materials has not been previously described or suggested.

It is therefore a primary object of this invention to provide a composite flexible blanket insulation having improved thermal insulation due to new elements included in the blanket. The new blanket has a thermal insulation capability well beyond those insulations known and used until now and provides, at the same time, a substantial weight savings. The new blanket is suitable for use in the spacecraft industry, for furnace curtains, fire tools and equipment, or for any other use where the temperature capability, insulation efficiency and weight are all equally important.

The U.S. Pat. Nos. 3,007,596, 3,018,016, 3,152,003 and 3,274,788 are of general interest. All references, patents, articles, standards, etc., cited herein are expressly incorporated by reference.

SUMMARY OF THE INVENTION

One aspect of this invention is a lightweight, composite, multilayered, flexible, durable and reusable multilayer blanket insulation consisting of top and bottom layers of silicon carbide fabric, one or both of which have a new interlock design; of insulation layers; of a multilayer area made of reflecting radiation shield layers of single or double aluminized polyamide or metallic film on a polymeric substrate, or a honeycomb metal foil made of the same material as the shield alternating with aluminoborosilicate scrim, felt or polyamide film or other suitable spacer, all these layers sewn together into a quilt-like blanket with high temperature resistant ceramic thread.

Another aspect of this invention is an insulation blanket having a thermal insulating capability for temperatures up to 1650° C. on the hot exterior surface wherein the current improvements result in low backface temperature, in substantial weight savings, in lower thermal diffusivity or conductivity and the surface density is significantly higher than those state-of-the-art insulations, thus assuring the higher emissivity of the new blanket.

Still yet another aspect of this invention is a composite flexible blanket insulation, wherein the foil is aluminized Kapton honeycomb foil.

Still another aspect of this invention is a composite flexible blanket insulation, wherein the aluminized foil is Kapton aluminized on one side only.

Yet another aspect of this invention is an insulation blanket of which the outer surface (top) is silicon carbide fabric having an interlock design with the inner backface (bottom) fabric made of ABS or silica.

BRIEF DESCRIPTION OF THE DRAWINGS

FIG. 2 is a side cross-sectional view of the multilayered insulation blanket.

FIG. 3 is an enlarged cut out portion of the insulation of FIG. 2, showing the alternating layers of honeycomb metal foil and spacer.

FIG. 6 depicts a honeycomb foil configuration of cells before (6A) and after (6B) stretch forming.

FIG. 10 depicts a comparison of a new silicon carbide and a regular silicon carbide fabrics and the effect of temperature on their total hemispherical emittance.

DETAILED DESCRIPTION OF THE INVENTION

Definitions

As used herein:

"Denier" refers to the number of grams per 9000 m, using a direct yarn numbering system expressing yarn number in terms of mass per unit length.

"Filament" refers to a variety of fiber having an extreme length which are not readily measured.

"Thread" refers to a flexible small diameter yarn or strand, usually treated with a surface coating, lubricant or both used to stitch one or more pieces of material.

"Tow" refers to a twistless multi-filament strand suitable for conversion into staple fibers or sliver, or for direct spinning into yarn.

"Yarn" refers to a continuous strand of textile fibers, filaments or materials in a form suitable for knitting, weaving, or otherwise intertwining to form a textile fabric.

Figure 9:
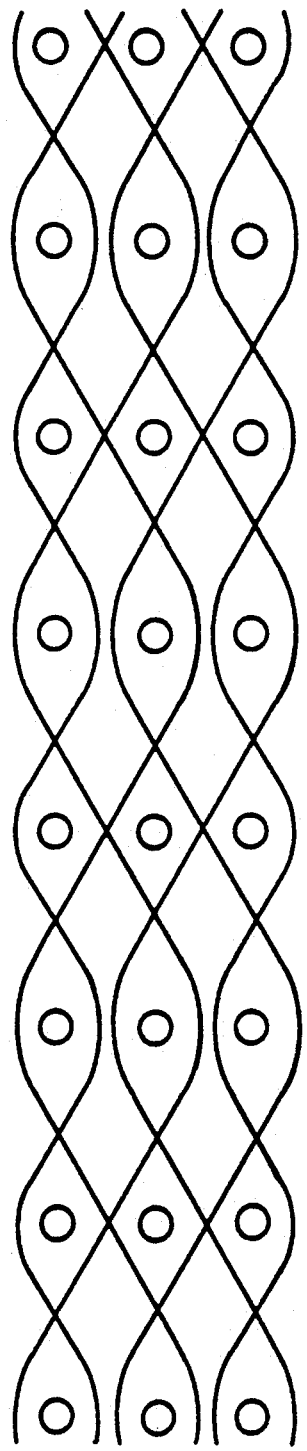
FIG. 9 depicts the design of weave-type interlock three-ply silicon carbide fabric.

"Interlock design" or "interlock silicon carbide fabric" refers to silicon carbide fabric having the pattern as shown in FIG. 9, and generally it consists of three layers of at least three-ply silicon carbide yarn interlocked in a specific pattern of interweaving one ply with the second and third ply. The resulting fabric acquires two very important features compared to the regularly weaved fabric. First, it has a much larger surface which has high density, and second, it has high emissivity.

"Honeycomb" or "honeycomb technology" refers to a honeycomb-like pattern, as described in U.S. Pat. No. 4,550,046, issued on Oct. 29, 1985.

The definitions described in "Standard Methods of Testing Sewing Threads ASTM D204," Vol. 07.01, American Society of Testing Materials (1983) are specifically incorporated herein by reference.

THE DESIGN. COMPONENTS AND FABRICATION OF COMPOSITE FLEXIBLE BLANKET INSULATION

The composite flexible blanket insulation of the current invention provides an improved lightweight insulation which is extremely effective in terms of thermal protection of structures subjected singly or repeatedly to high heat fluxes. The present insulation utilizes the previously known multilayer insulation concept, in particular CFBI, to derive a new lightweight insulation configuration having improved insulation properties at high temperatures and at near vacuum conditions.

The new insulation blanket is made generally of the same components as CFBI but these components are improved to provide substantial weight savings, substantial decrease in backface temperature, lower thermal conductivity and increased emittance. These improvements are caused partly by a newly-designed interlock silicon carbide fabric used for the outer surface covers, partly by substituting flat foil aluminized on both sides with foil aluminized on one side only and partly by using the honeycomb pattern instead of the flat foil. The new insulation blanket materials are quilted together into an insulation blanket with durable silicon carbide or with other high temperature withstanding ceramic threads. The primary features of this invention are an optimal blanket insulation layer configuration, an optimal combination of multilayer area (MLA) within the insulation, improved thermal insulation capability and significant weight savings.

Honeycomb Patterned Materials and Foils

One improvement over the Composite Flexible Blanket Insulation (CFBI) described previously in U.S. patent application Ser. No. 07/410,576 issued as the U.S. Pat. No. 5,038,693 on Aug. 13, 1991, is a utilization of honeycomb technology in these high temperature insulations. The high temperature insulation of this invention utilizing honeycomb technology, similar in construction to a CFBI, provides two additional features/advantages over the use of flat insulation sheets. The honeycomb patterned sheets have lower thermal diffusivity/conductivity without increase in weight and provide substantial weight savings over conventional insulations. The new CFBI insulation of this invention utilizes honeycomb-like patterned foils which reduce the weight of the CFBI blanket or other insulation material and improve its durability in thermal protection systems able to withstand temperatures around and above 1450° C. When the honeycomb is used in configuration or combination with an insulation such as CFBI, it reduces the overall thermal diffusivity and thermal conductivity of the system.

The honeycomb foils, singly or two or more stacked together, effectively prevent convection and reduce conduction through the structure. The honeycomb patterned materials can be produced from highly reflective, highly absorptive or nearly transparent materials to prevent or allow radiation depending on the heating environment. The honeycomb cell dimensions may be designed in such a way as to prevent or allow convection, or to increase or decrease the solid viewing angle through the insulation which effects radiation. The versatility of the honeycomb containing CFBI is unlimited and depends on the degree of stretch introduced; on the size and geometry of slits; on the material used, on a given number of sheets and on the combination used of all these variables. The honeycomb-containing CFBI blanket can be tailored with the different types of honeycomb to be an effective insulator for specific heating environments, which may contain both convective and radiative heating components.

The honeycomb technology seen in FIGS. 6A and 6B generally represents a layer of open-ended cells 58 fabricated from a flat, preferably flexible, sheet of thin material 50 perforated with numerous slits 56 are made in a pattern resulting in controlled geometry air cells 58 after stretching the foil perpendicularly to the axis of the cells as seen in FIG. 6B. The non-stretched flat sheet 50 of material showing the slits 56 is seen in FIG. 6A. The stretched, that is expanded material 52 containing expanded slits 56 in a cross-direction of the slits 56, forming open ended cells 58 is seen in FIG. 6B. The sheet 52 shows the honeycomb-like pattern fabrication containing a multiplicity of honeycomb-like cells 58, The manufacture of honeycomb-like materials is included in U.S. Pat. No. 4,550,046, incorporated herein by reference.

The honeycomb technology is flexible in allowing use of a wide variety of materials, various cell dimensions and numerous combinations of honeycomb and barrier elements.

The honeycomb-like material has an unusual geometry. The process for preparing the honeycomb-like pattern involves expanding a previously flat two dimensional sheet of material into a three dimensional structure in such a way that the occupied volume increases substantially. This honeycomb pattern can be produced from many non-woven materials including polyamide plastic film, metal foil, aluminized foil, Saran ® wrap, Mylar film, ceramic metalized papers such as silica or quartz and any other suitable material. The geometry of the honeycomb pattern is unusual because many of the honeycomb walls are angled at 60° instead of vertical as in load-bearing honeycomb.

The preferred material for use in this invention is a polyamide foil aluminized or gold plated on one or both sides, or a metal foil made of aluminum or stainless steel.

The polyimide foil (DuPont Kapton ®), which is particularly preferred, is available in 0.00076 cm thickness, coated on one or both sides with 700 to 1000 angstroms of vacuum-deposited aluminum from sources such as Sheldahl (Sheldahl, Inc., 1150 Sheldahl Rd., Northfield, Minn. 55057). The non-woven quartz paper is available in a 0.0127 cm thickness from Pallflex Corporation, Denver, Colo.

The use of new honeycomb-like patterned material in the fabrication of CFBI results in substantial weight savings. For example, the original CFBI insulation uses scrim elements as spacers that weigh approximately 34 g/sq.m. The honeycomb patterned alternative material produced from 0.00076 cm thick Kapton would weigh approximately 7.8 g/sq.m. Because at least nine such elements would be used and up to thirty such elements could be used in these insulations, the total weight savings possible by substituting honeycomb foil for scrim would be from 300–800 g/sq.m. Since the honeycomb layers may also be aluminized, the need for reflective foil layers may be reduced or eliminated, providing further weight savings of another 150–400 g/sq.m.

CFBI blankets were originally designed for thermal insulation of spaceships. The latest improvements were specifically designed for insulation for the Aeroassist Flight Experiment (AFE). The total weight of the current blanket, designed to limit AFE skin temperature to 176° C. would be around 1177 g/sq.m. This provides a total savings of around 1.2 kg/sq.m. compared to prior CFBI and Tailorable Advanced Blanket Insulation. Considering the large surface area of proposed aerobrakes, the use of honeycomb materials will significantly reduce weight without sacrificing durability. While the most preferable material for insulation of this invention is a polyimide honeycomb, quartz honeycomb able to withstand temperatures to 1950° C., similarly has wide utility in other atmospheric entry vehicles.

Figure 1:
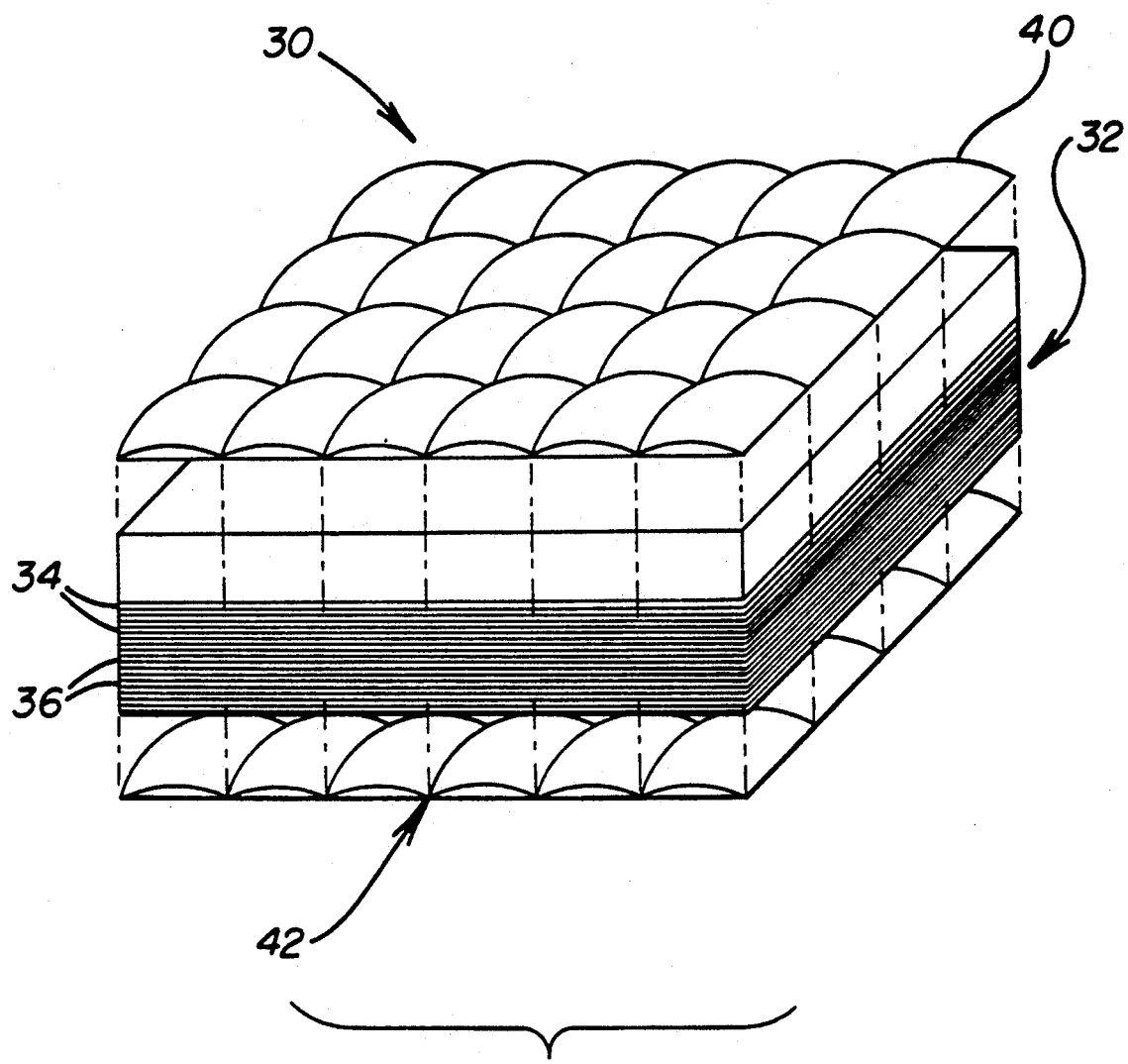
FIG. 1 is a perspective view of a configuration of CFBI multilayer and composite insulations of this invention.
Figure 4:
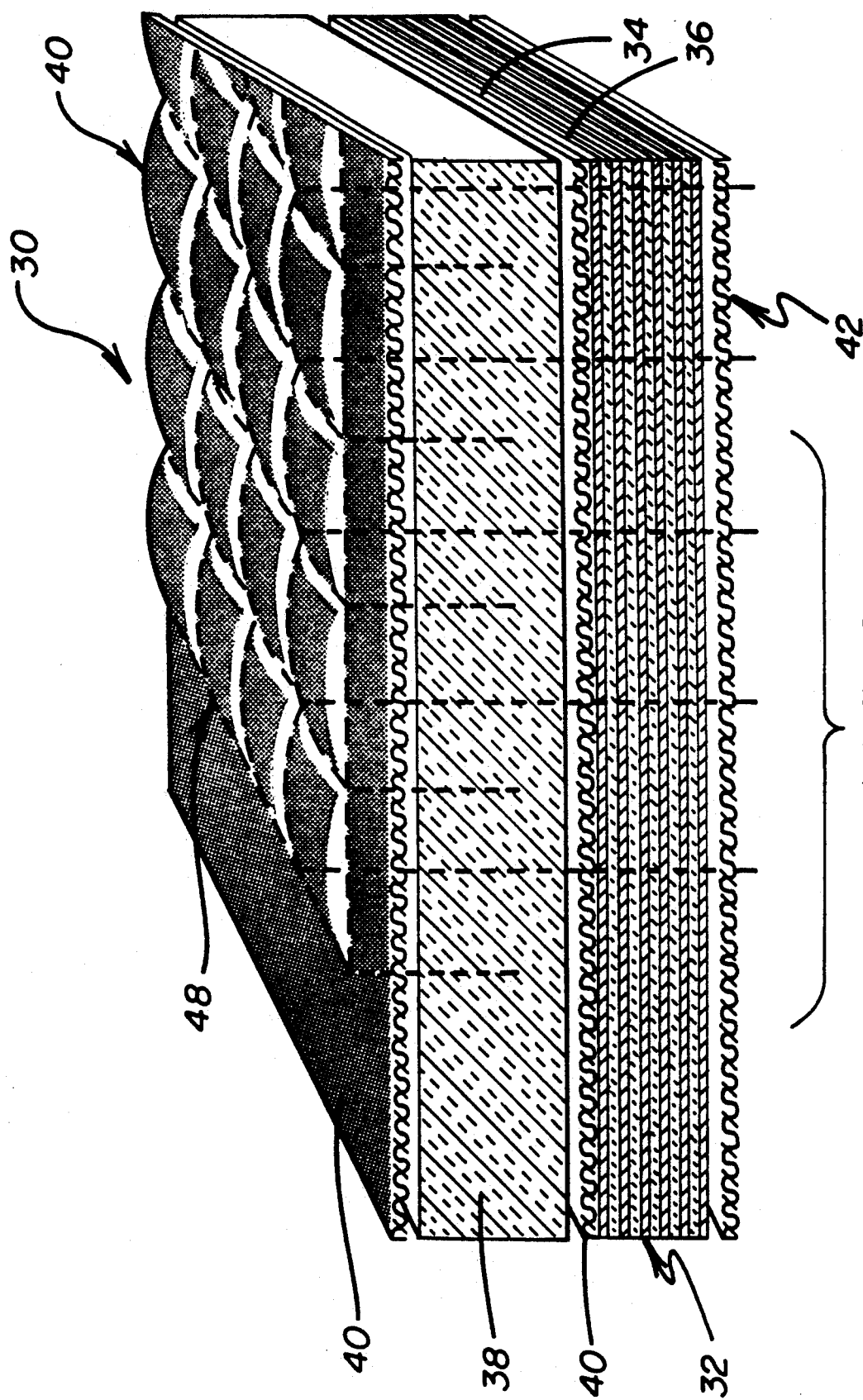
FIG. 4 is a perspective overview of completed quilted insulation blanket configuration.

In the new CFBI blanket, as seen in FIGS. 1, 2 and 4, honeycomb separators would preferably substitute the scrim-cloth or crinkled Kapton currently used in multi-layer area (MLA) 32, as seen in FIGS. 1-4. The flexible honeycomb layers, produced from polymeric or ceramic materials, are more durable than the crinkled Kapton and significantly lighter in weight than scrim.

The honeycomb-like material is quite versatile in its application in various insulation designs. For example, several layers of honeycomb stacked together effectively prevent convection and reduce conduction and radiation with a lightweight homogeneous assembly. If reflective barriers are inserted between some or all of the honeycomb layers, radiation is further reduced and the conductivity decreases substantially. Furthermore, the honeycomb may be selectively produced from highly reflective, highly absorptive or nearly transparent materials to either prevent or allow radiation. Lastly, cell dimensions may be varied to prevent or allow convection, or to increase or decrease the solid viewing angle through the insulation which impacts radiation. The honeycomb insulation is an improvement in CFBI because it reduces the weight of the multilayer area 32 elements. In FIG. 1, the MLA 32, for example, is shown as 10 layers of reflective shield 34 alternating with spacers 36. If the reflective shield is currently made of stainless steel and the spacer is made of aluminoborosilicate scrim cloth, by using the honeycomb concept when the scrim is replaced with honeycomb structure, a substantial weight savings is realized; this is even more so when the stainless steel is substituted with Al Kapton aluminized on one side.

In an experimental set-up, CFBI blankets consisting of an outer layer of silicon carbide fabric, alumina (Saffil ®) insulation and aluminized Kapton honeycomb foil of various weights were compared with a similar blanket containing flat aluminized Kapton foil. The blankets were exposed to the Thermal Diffusivity Apparatus and the thermal response of the composite insulations was determined using a procedure and apparatus described previously in *NASA Tech. Brief*, 10642 (January 1979). The pressure used in the apparatus for testing configurations 1-4 (Table 1) was 1.2-1.5 mm Hg. The pressure 1.5 mm Hg simulates the vacuum environment of the various aerospace vehicles. The temperature pulse applied to the front surface was between 1000° C. and 1200° C. The backface temperature was measured for 15-20 minutes.

Four variations (1-4) of CFBI were prepared where Al Kapton honeycomb of different weight was substituted for scrim cloth as a spacer or, in the alternative, as a reflective shield. A thermal response of blankets containing Al Kapton honeycomb, having a mass of 0.5 g (Sample 1); 0.7 g (Sample 2), or 1.97 g (Sample 3) was compared to those containing flat Al Kapton foil scrim cloth, having a mass of 1.9 g. Their thermal response was expressed as backface temperature. The results are shown in FIG. 7

The insulation thermal diffussivity or thermal response is generally measured by the increase in backface temperature as a function of time. The "backface temperature" is defined as the temperature measured at the bottom inner mold line fabric 42 after exposure of the front face or the outer mold line fabric 40 surface to high temperature, in this instance to temperatures between 1000° C. and 1200° C.

Figure 7:
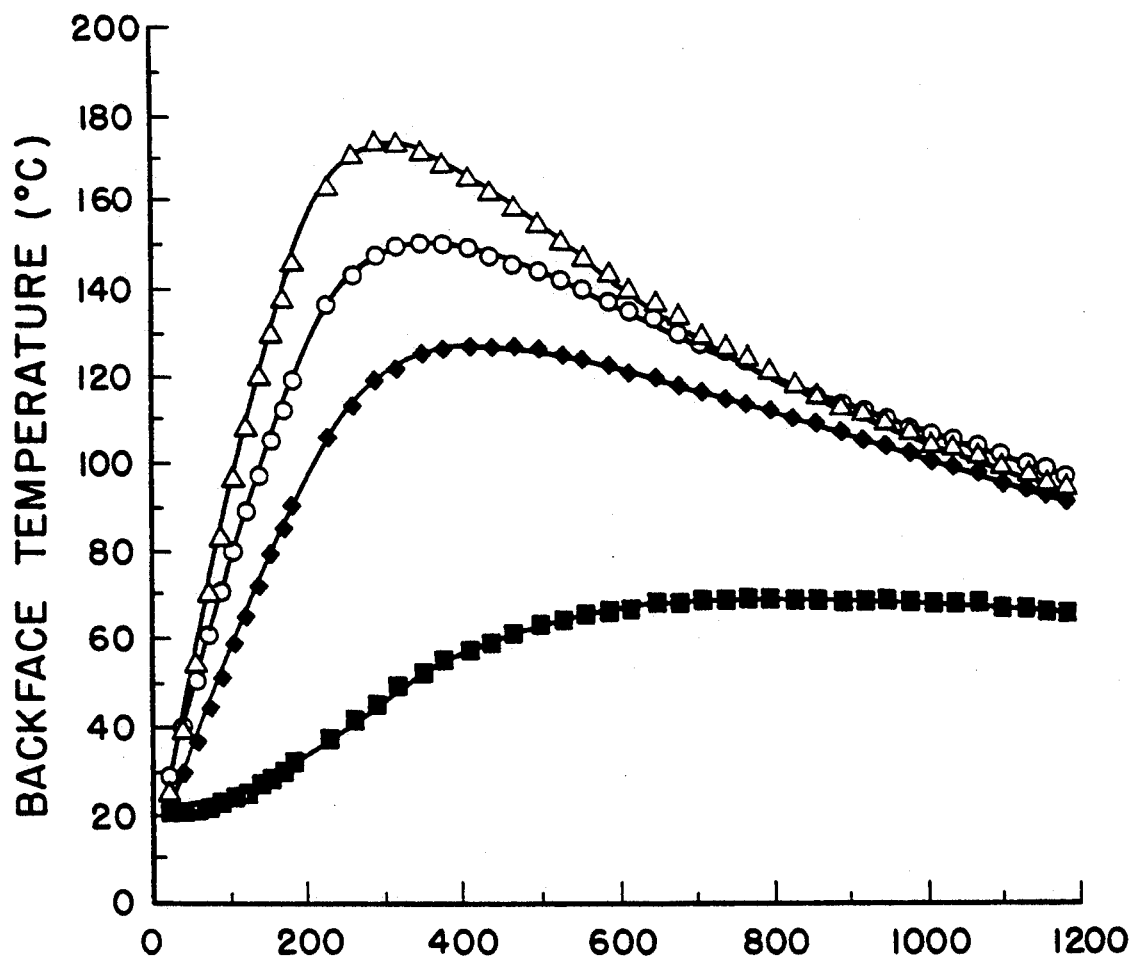
FIG. 7 depicts a thermal response of multilayer foil insulations with or without a honeycomb foil.

The test results of backface temperature as seen in FIG. 7 are the average of eight test runs from each configuration. Backface temperature was measured with an apparatus shown in FIGS. 5A and 5B. Two thermocouples 60 and 62 were used to determine the top 60 and bottom 62 temperatures. A furnace control thermocouple was embedded in a black reaction cured glass coating 66 on the top (FIG. 5A) of the thermal diffusivity sample holder 70, shown in FIGS. 5A and 5B. A second calorimetric thermocouple 62 was embedded in the fabric 42 covering the bottom or the backface of the CFBI 30 insulation, as seen in FIG. 1.

Figure 5:
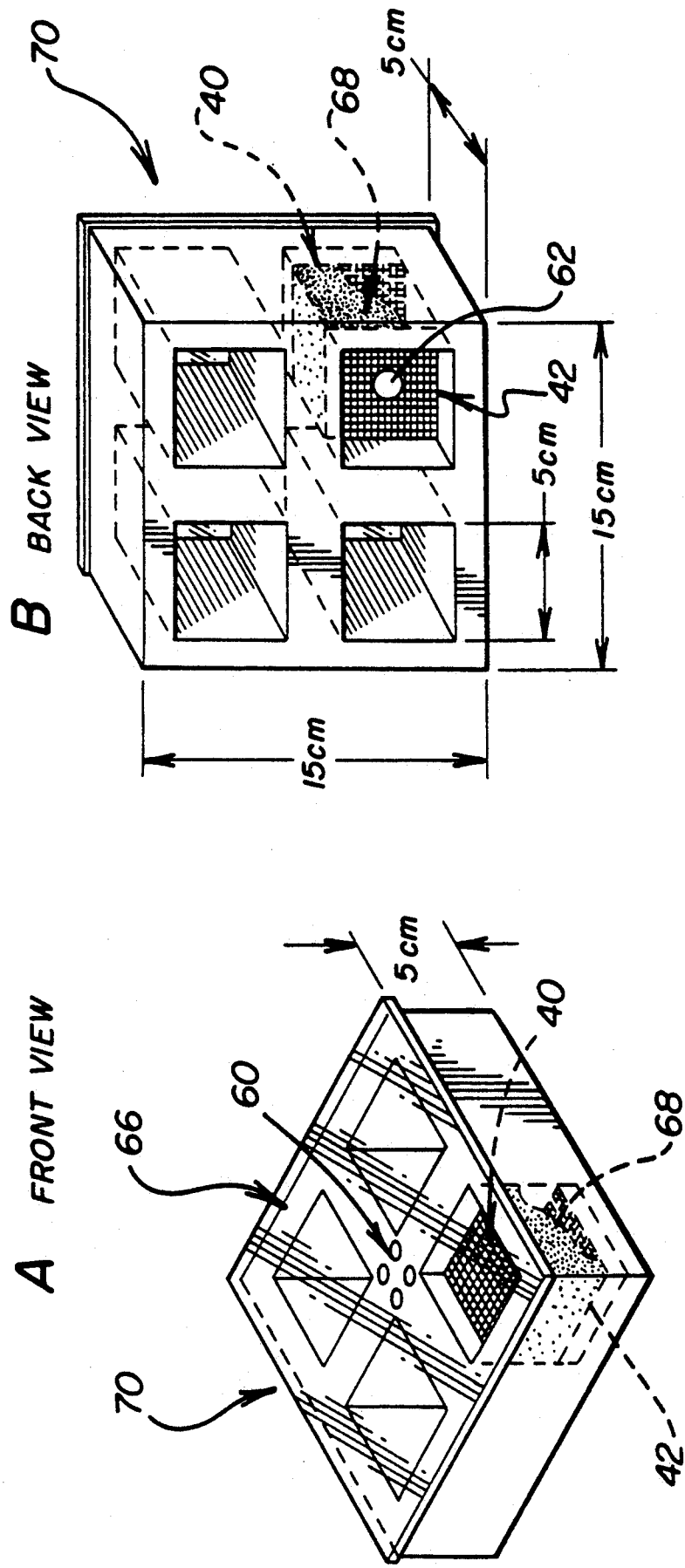
FIG. 5 is a thermal diffusivity sample holder front view (5A) and back view (5B) with test sample in position.

FIG. 5A shows the thermal diffusivity sample holder 70 from the front view. The sample 68 of CFBI was placed in one of the chambers of the holder 70. The top side of the holder has a black coating 66. In the coating 66, the furnace control thermocouples 60 were embedded to measure temperature to which the outer mold line fabric 40 is subjected. The second thermocouple 62 is embedded in the inner mold line fabric 42. The temperature measured by the second thermocouple 62 is the backface temperature. The backface temperature is commonly used to describe the insulation properties of the material or composite blanket. When, for example, the thermocouple 60 measures the temperature of the furnace 1000° C. and the second thermocouple 62 measures only 100° C. backface temperatures, the insulation capacity of the tested material is around 90%. When, under the same conditions, the backface temperature is 900° C., insulation capacity is only 10% and the insulation properties of the tested material are poor.

The test results are shown in FIG. 7. In comparing the flat foil (empty triangles) and the honeycomb (squares) of equal weights, it is evident that the backface temperature of the insulation containing the honeycomb is much cooler than the flat aluminized foil. Even honeycombs of lesser weight than the flat foils (empty circles and diamonds) resulted in lower (cooler) backface temperatures of the insulation. Thus, as seen in FIG. 7, the blanket containing the flat Al Kapton (Δ) backface temperature reaches 180° C. in 400 seconds, whereas the blanket containing the honeycomb foil of the same weight (■) reaches only about 50°-60° C. The blankets containing honeycomb foils of lesser weight (♦ and ○) show a lesser insulation capability than the heavier and thicker blanket, (■), but their insulation capability is still better than that of the flat foil (Δ). The Al Kapton honeycomb 0.7 g. (♦) reaches maximum backface temperature of around 120°-125° C. and the thin Al Kapton honeycomb (○), having a mass and thickness almost 4 times lesser than flat foil, shows a maximum backface temperature around 150° C. All blankets containing honeycomb insulations are thus better than the flat foil insulation (Δ).

Table 1 illustrates a composition of MLA of CFBI blankets tested for their thermal response mass and thickness, comparing conventional MLA Δ honeycomb ○, ♦, and MLAs.

TABLE 1

| Sample # | | Description | Mass g | Thickness/inch |
|---|---|---|---|---|
| 1 | ○ | Alternating Al Kapton/Al Kapton Honeycomb | 0.489 | 0.238 |
| 2 | ◆ | Alternating Al Kapton/Al Kapton Honeycomb | 0.709 | 0.210 |
| 3 | ■ | Alternating Al Kapton/Al Kapton Honeycomb | 1.910 | 1.000 |
| 4 | △ | Al Foil/Scrim Cloth | 1.890 | 0.164 |

Data shown in FIG. 7 suggests that honeycomb (○) MLA saves more than 75% of the weight of the current flat MLA. The thermal response data in FIG. 7 indicate that both Samples 1 and 2, (○ and ◆) honeycomb MLA provided superior protection to Sample 190 4 (△) which is a conventional MLA. Moreover, Sample #3, the honeycomb blanket of nearly the same weight insulation as the conventional MLA, remained at all times more than 100° C. cooler.

The four designs tested above were assembled using simple, hand-operated equipment. Honeycomb material, be it polyimide or quartz, was produced by creating a continuous pattern of staggered perforations in the web using a matched set of rotary dies. A pattern of slits in the foil allows it to expand if stretched lengthwise, that is perpendicular to the axis of the slits. In this way, the occupied volume increased approximately 140%. Once stretched and set in place, the honeycomb structure can be used to create an efficient thermal insulation as seen from the results. The perforated material is expanded to form the honeycomb-like structure. Kapton honeycomb is set in place with heat, while quartz honeycomb is set by misting with water. For testing, eight inch diameter circles are cut from the honeycomb fabric using a template as a guide. For those specimens requiring flat barriers to block or reflect radiation, eight inch diameter circles are cut from nonperforated aluminized Kapton and quartz as well. The honeycomb and barrier elements are next assembled according to the design of the CFBI to be tested. To better block radiation, the honeycomb elements are alternately rotated 90° using the axis of expansion as the reference. Following assembly, the specimens are stored in a plastic bag to await testing. These construction steps and storage are the same for each of the four designs tested.

Single Aluminized Foils

The second novel feature of this invention concerns findings that the single side aluminized foils exhibit lower thermal conductivity than the double side aluminized foils. This feature provides a new insulation with extremely low thermal conductivity, which is especially useful in low pressure environments such as aerospace applications.

Two composite flexible blanket insulations (CFBI) were fabricated and tested in accordance with the procedure described in Example 2 to determine the thermal conductivity. The blankets were of identical construction except that one blanket contained single aluminized foils and the other blanket contained double aluminized foils.

The two composite flexible blanket insulation tested were:

CFBI-1, made of silicon carbide, alumina, aluminized Kapton on one side, 1.03 inches thick, 8.23–8.38 lb/ft$^3$ density.

CFBI-2, made of silicon carbide, alumina, aluminized Kapton on both sides only, 1.03 inch thick, 9.25–9.40 lb/ft$^3$ density.

Figure 8:
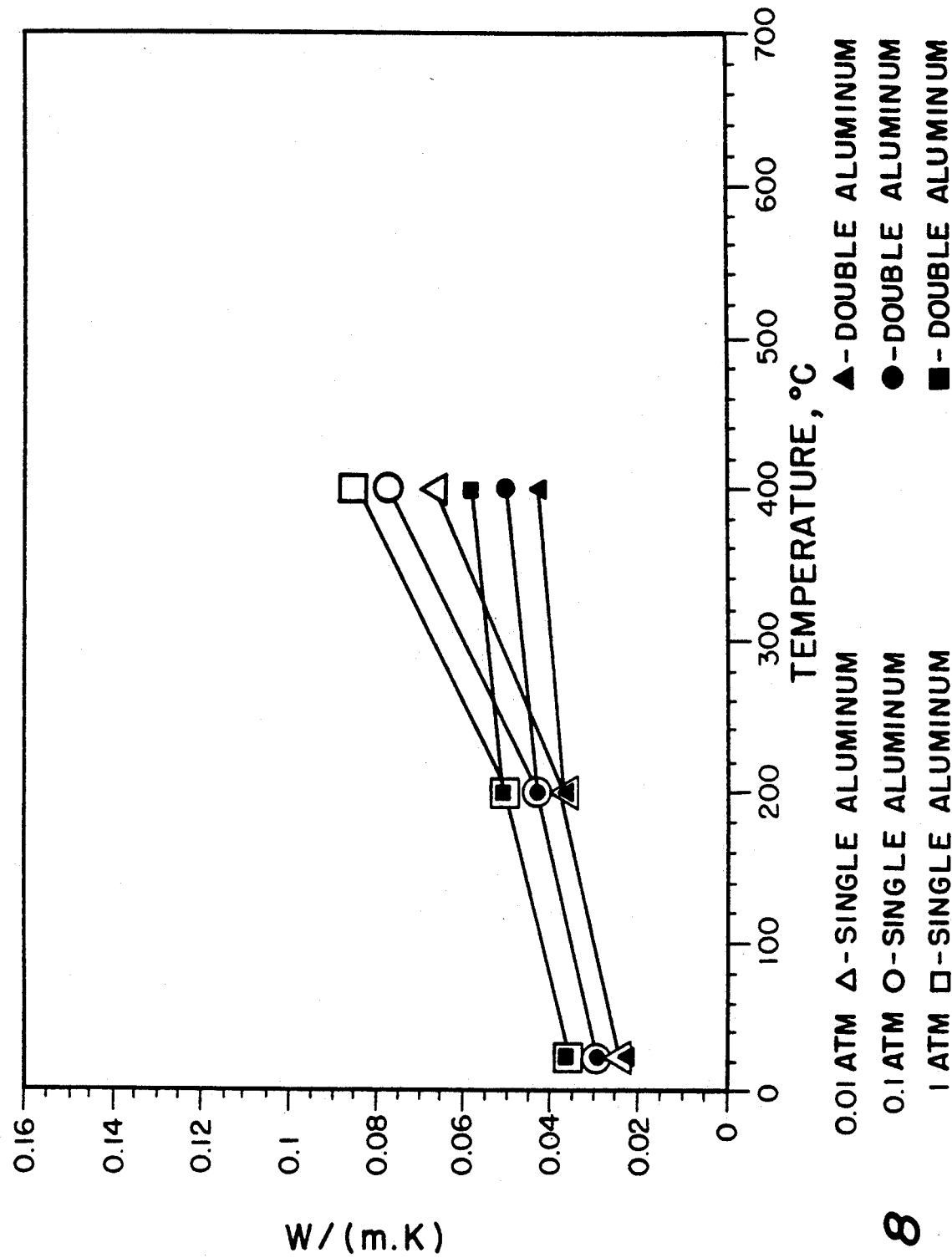
FIG. 8 depicts an apparent thermal conductivity of CFBI with one and two sided aluminized foils.

Both blankets were tested at temperature of 23°, 200° and 400° C., at 1.0; 0.1 and 0.01 ATM pressures and the results are shown in FIG. 8. The apparent thermal conductivities of one-side aluminized foil (△, ○, □) and two sided aluminized foil (▲, ●, ■) clearly show the decrease in thermal conductivity seen for one-side aluminized foil. This decrease is particularly visible at temperatures between 200° and 400° C.

Tables 2 and 3 list the apparent thermal conductivity and thermal resistance values for the two insulation thermal conductivity vs. temperature relation for the two materials measured. CFBI-1 containing single aluminized Kapton exhibited lower thermal conductivity than double CFBI-2 in all test conditions.

TABLE 2

Apparent Thermal Conductivity and Thermal Resistance CFBI-1 Single Aluminized Kapton

| Temperature | | Thermal Conductivity | | | Thermal Resistance | |
|---|---|---|---|---|---|---|
| C. | F. | W/mK | BTU in/hr ft$^2$ | F. | hr ft$^2$ | F./BTU |
| @ 1.0 ATM | | | | | | |
| 23 | 73 | 0.036 | 0.250 | | | 4.12 |
| 200 | 392 | 0.051 | 0.354 | | | 2.91 |
| 400 | 752 | 0.059 | 0.409 | | | 2.52 |
| @ 0.1 ATM | | | | | | |
| 23 | 73 | 0.029 | 0.201 | | | 5.12 |
| 200 | 392 | 0.043 | 0.298 | | | 3.46 |
| 400 | 752 | 0.051 | 0.354 | | | 2.91 |
| @ 0.01 ATM | | | | | | |
| 23 | 73 | 0.023 | 0.159 | | | 6.48 |
| 200 | 392 | 0.037 | 0.257 | | | 4.01 |
| 400 | 752 | 0.044 | 0.305 | | | 3.38 |

TABLE 3

Apparent Thermal Conductivity and Thermal Resistance CFBI-2 Double Aluminized Kapton

| Temperature | | Thermal Conductivity | | | Thermal Resistance | |
|---|---|---|---|---|---|---|
| C. | F. | W/mK | BTU in/hr ft$^2$ | F. | hr ft$^2$ | F./BTU |
| @ 1.0 ATM | | | | | | |
| 23 | 73 | 0.035 | 0.243 | | | 4.24 |
| 200 | 392 | 0.049 | 0.340 | | | 3.03 |
| 400 | 752 | 0.084 | 0.582 | | | 1.77 |
| @ 0.1 ATM | | | | | | |
| 23 | 73 | 0.030 | 0.208 | | | 4.95 |
| 200 | 392 | 0.043 | 0.298 | | | 3.46 |
| 400 | 752 | 0.078 | 0.541 | | | 1.90 |
| @ 0.01 ATM | | | | | | |
| 23 | 73 | 0.026 | 0.180 | | | 5.72 |
| 200 | 392 | 0.039 | 0.270 | | | 3.81 |
| 400 | 752 | 0.066 | 0.458 | | | 2.25 |

When compared, CFBI-1 (Single Aluminized Kapton) and CFBI-2 (Double Aluminized Kapton) had the same or almost the same apparent thermal conductivity (expressed as W/(mK)) at 23° and 200° C. for all three pressures (0.01; 0.1 and 1 ATM). At a critical period between 200° and 400° C., their apparent conductivities and thermal resistance differ. While the apparent conductivity of the CFBI-1 increases only slightly at 1 ATM, from 0.051 and 200° C. to 0.59 at 400° C., it increases substantially from 0.049 at 200° C. to 0.084 at 400° C. for CFBI-2. A similar increase in thermal conductivity is apparent in both other pressure conditions, i.e., at 0.1 ATM, CFBI-2 shows an increase from 0.043 to 0.078; for 0.01 ATM, the pressure increases from 0.039 to 0.066. Thermal resistance for CFBI-1 and CFBI-2 in all three cases is decreasing with increasing temperature but for CFBI-1 the decrease is smaller than for CFBI-2.

III. Silicon Carbide Fabric

Silicon carbide fabric has previously been found to provide certain advantages when used as top and bottom cover layers of the CFBI. Recently, it has been discovered that silicon carbide fabric having the special interlock design has a higher emittance than other silicon carbide fabrics. Previously used silicon carbide fabrics are fabricated in plain weave or satin weave. These materials do not achieve the high surface density and packing that the new interlock fabric provides. The high density and packing of the interlock fabric increases its emittance over other silicon carbide fabrics resulting in a cooler surface temperature. The higher the emittance of the fabric, the better the thermal performance of the fabric, particularly in an aeroconvective heating environment. Fabric which has higher emittance can function at higher heat flux. This allows it to operate and perform at higher temperatures.

The interlock design silicon carbide fabric is shown in FIG. 9 where the "'" designates picks and fill and "∼" designates warp and binder yarn.

The new fabric is a type of fabric having generally the same or similar composition as SiC-1. SiC-1 is described as the yarn Nicalon ® type NLM 202, size P, 600 denier, 200 filaments/tow. Fabric yarn count is 93/inch (warp)×87 inch (fill)±5%. Fabric width is 30.5 inch minimum; fabric weight is 15.7±5% oz/yd ∧ 2; fabric thickness is 0.025 inch±10%; and weave type is interlock 3 ply as shown in FIG. 9. The fabric is manufactured by processors known in the art, supplied by, for example, Fabric Development, Inc., Qusquertown, Pa.

The original silicon carbide fabric (SiC-2) is described as silicon carbide type NLM 202;5 Harness active weave with sizing type M yarn count 1260 warp by 670 fill per meter; 600 denier fabric weight 570 g/sq. meter; yarn factor 0.25, 1.5×10 3 filaments per sq. meter.

A new fabric of the present invention is identified as SiC-1 in FIG. 10, the control fabric is SiC-2.

Commercially available silicon carbide fabric identified in FIG. 10 as SiC-2 was compared for emissivity at various temperatures with the fabric of the present invention identified as SiC-1.

The emissivities of two silicon carbide fabrics SiC-1 and SiC-2 were determined at 1800° F., 1900° F., 2000° F., 2100° F., and 2200° F. A description of the equipment used for these measurements as well as the test procedures that were followed are described in Example 6.

The two methods, described in Example 6 yielded results that were in good agreement. The systems were also checked on standard surfaces (Reynolds aluminum foil and other high emissivity surfaces).

The unique structure and design of the fabric shown is in FIG. 9. The fabric consists of at least 3 layers which are interlocked. It provides interstructures having a very high density surface, which contributes to the high emissivity of the fabric. A comparison of the emissivities of the two fabrics is made in FIG. 10. As shown, the present fabric SiC=1 (◊) exhibits higher emissivities values at all temperatures than the prior art fabric. Other state of the art fabrics such as plain weave fabric exhibit similar lower emissivities due to the less dense surfaces.

The present fabric can be used as the outer layer of aerospace thermal insulations such as the composite flexible blanket insulation, as the inner layer of the CFBI, or for both outer 40 and inner 42 layers.

Composite Flexible Blanket Insulation

CFBI encompassing one or all of the improvements described in this invention were insulation blankets fabricated by the process described in Example 1.

FIG. 1 is a perspective view of CFBI blanket 30 of this invention. CFBI 30 is generally composed of top 40 and bottom fabric 42 and the multilayer insulation 32 is composed of reflective shield layer 34 interspaced with spacers 36.

The top fabric is made of an interlock silicon carbide fabric; the bottom fabric is made of aluminoborosilicate or with silica. MLA insulation layer 32 of the blanket 30 contains reflective shield metal foils 34 separated by spacers 36. Ten alternating layers 34 and 36 are shown in FIG. 1. There may be between 3-50 alternating layers, with 9-39 alternating layers being preferred. Variations of the MLA are shown in Table 4. Composite insulation contains aluminized polyamide (Kapton ®) or gold CVD film as the radiation shield material. The film is composed of Å of vacuum deposited aluminum on 0.0012 cm thick polyamide film. The use of this film may eliminate the need for spacer material. In the composite insulations the metal foils 34 act as the radiation shield in the multilayer assembly and must maintain their optical properties at high temperatures.

The main advantage of the use of the aluminized film as a reflective shield is the weight savings. The film weighs approximately 18 g/m$^2$. The thinnest aluminum foil commercially available is 0.00076 cm thick and weights 20 g/m$^2$. When combined with a thin ceramic scrim cloth, the total weight is 46 g/m$^2$. For objects with a large surface, such as aerobrakes of a space ship, or large insulation covers for the space shuttle, the weight is very important and thus this weight savings is substantial when applied to the whole area.

The spectral reflectance of the aluminum as a foil or chemically vapor-deposited aluminum on polyamide film does not degrade significantly as a function of temperature. The high reflectance of these films make them attractive as radiation shields.

Compositions of the blankets are shown in Table 4. These compositions are in no way exhaustive and all other possible combinations containing one, two or all three improvements described herein are intended to be within a scope of this invention.

Generally, each CFBI is composed of top and bottom fabric covers, an insulation layer 38, a multilayer area (MLA) comprised generally of two layers, alternating reflective shields and spacers. There may be from 2-50 layers of alternating reflective shields and spacers. CFBI will preferably have 9-30 layers of each. However, depending on intended use, there may be fewer or more layers, as needed. The honeycomb patterned material may completely substitute for the spacer. In any case, the optimal insulation capacity will be designed according to the requirements of the intended use. Thus, for example, for CFBI, there will be between 9-30 layers of reflective shield and spacers or 9-30 layers of honeycomb patterned material, while for house insulation there may be up to 50 or even more layers since the weight will not likely be that important.

On the other hand, for a use such as for firemen's suits and parkas, there will be less than nine layers because the weight of the insulation is critical.

Several types of CFBIs were evaluated having various types of ceramic insulations, reflective shields and a new type of silicon carbide fabric. The CFBIs 1-17 combinations are listed in Table 4. The new interlock design silicon carbide, was used as a top fabric. In some instances, the top fabric was silica. The insulations 38 used in CFBIs 1-17 included either silica, aluminoborosilicate, or silica felt. As the reflective shield, polyimide or aluminum foils in two different geometries, flat or honeycomb, were used. The foils were separated by spacers such as ABS or silica scrim or, particularly when honeycomb-patterned, were substituted with this material completely, so that in those instances, as in CFBI 1-4 (Table 4), the reflective shield was made of aluminized Kapton on one or both sides interspaced by honeycomb patterned material. In the alternative, as seen in CFBI 14-17, spacers were omitted and honeycomb patterned foil functioned as a sole reflective shield.

Aluminized polyamide film may be substituted with any high temperature organic film having similar thermal and weight properties, such as, for example, gold or platinum deposited on film. High temperature organic films include, for example, KEVLAR ®, TEDLAR ® (polyvinyl fluoride), KAPTON ®, available from Du-Pont, Wilmington, Del., or PEEK (polyetherether ketone) from Imperial Chemical Industries, Petrochemical and Plastics Division, Welwyn Garden City, United Kingdom. The metal deposition is accomplished by procedures such as chemical vapor deposition (CVD), which are conventional in the art. The metal-deposited high temperature film is usually available by special order from the film manufacturer. The thickness of the metal layer needs to be of a uniform layer over the plastic film. Usually it is between about 100 and 3000 microns, preferably about 200 microns in thickness.

A description of various composite insulations that have been or are fabricated and tested is shown in Table 4.

The most important features of this invention are the improvement in thermal insulation and the light weight of the composite flexible blanket insulation.

Improvements described herein provide a substantial weight saving. The other important features of this invention are the improved thermal insulating capability, as described, and an adequate strength retention of various materials such as silica, silica mat, silica felt, silica scrim, ABS, ABS felt, ABS scrim, SiC or other sewing threads and yarns used in fabrication of CFBI, which are responsible for the durability of the insulation. Aside from these improvements, it is also important that the ceramic fibers and yarns, such as silica, ABS, silicon carbide and the like which are used to prepare the CFBI structures, have adequate strength retention after various stages of handling, weaving, and assembly into CFBI blanket. SAMPE Quart., 17:7-13 (1985) describes the strength and flexibility behavior of these yarns in fabric form. The ability of these yarns to survive the dynamic forces of weaving and fabrication is fundamental to the successful application of all new and known insulations for any advanced space vehicle.

Performance of the Too/Bottom Fabrics in a Convective Heating Environment

Still another important feature of both the fibers and sewing threads used for CFBI fabrication is the emittance of the surface fabric and the sewing thread since the performance of a CFBI during reentry into the atmosphere is effected by the emittance of the surface fabric.

The higher the emittance, the better the insulation capability and/or thermal performance of the fiber. Any fiber which has higher emittance functions at higher heat flux, which allows it to operate and perform at higher temperatures.

When three fibers, ABS, silica and silicon carbide, were compared previously for their hemispherical emittance, the silicon carbide fabric had a total hemispherical emittance higher (between 0.55-0.70) at a temperature of around 1090° C., compared to an emittance of about 0.46 for ABS and 0.43 for silica. At 1538° C.

TABLE 4

| COMPOSITE INSULATION VARIATIONS | | | | | | | | | | | |
|---|---|---|---|---|---|---|---|---|---|---|---|
| Composite Insulation Components | 1 | 2 | 3 | 4 | 5 | 6 | 7 | 8 | 9 | 10 | 11 |
| Top Fabric | ISCF | ISCF | ISCF | ISCF | ISCF | ISCF | ISCF | ISCF | ISCF | SL | SL |
| Insulation Type | SLF | ABS | SLF | ABS | ALF | ALF | SLF | SLF | SLF | SLF | SLF |
| Spacer | K | K | K | K | ABS | ABS | SS | SS | K | K1 | HAK1 |
| Reflective Shield | AK1 | AK1 | AK2 | AK2 | AK1 | AK2 | AK1 | AK2 | AK1 | AK1 | AK2 |
| Bottom Fabric | SL | ABS | SL | ABS | ABS | ABS | SL | SL | ABS | ABS | SL |

| Composite Insulation Components | 12 | 13 | 14 | 15 | 16 | 17 |
|---|---|---|---|---|---|---|
| Top Fabric | SL | SL | ISCF | ISCF | ISCF | ISCF |
| Insulation Type | ABS | ABS | SLF | ABS | SLF | ABS |
| Spacer | HAK1 | HAK1 | — | — | — | — |
| Reflective Shield | AK2 | AK2 | HAK1 | HAK1 | HAK2 | HAK2 |
| Bottom Fabric | ABS | SL | SL | ABS | SL | ABS |

ISCF = Interlock Silicon Carbide Fabric
HAK1 = Honeycomb Al Kapton - One side aluminized
HAK2 = Honeycomb Al Kapton - Both sides aluminized
SLF = Silica Felt
SL = Silica
SS = Silica Scrim
ABS = Aluminoborosilicate
ALF = Alumina Felt
AK1 = Al Kapton - One side almuinized
AK2 = Al Kapton - Both sides aluminized
K = Kapton (2800° F.), SiC has an emittance still around 0.45 to 0.52, while both ABS and silica have much lower emittance of about 0.35 or 0.36 respectively. At room temperature, all three fabrics have emittances above 0.8. The new results, shown in FIG. 10, show that the emittance of the silicon carbide is further improved when it is woven in a new design which allows interlocking the silicon carbide fibers, as seen in FIG. 9.

The new interlock silicon carbide (SiC-1) at 1800° F.(° C.) has an emittance of around 0.712, as compared to the regular silicon carbide (SiC-2) emittance of approximately only 0.691. This difference is seen throughout testing at 1800°, 1900°, 2000°, 2100° and 2200° F. While emittance in both fabrics decreases, it decreases at the same rate and interlock silicon carbide fabric emittance is always higher.

Other fibers or yarns can be used as insulation, or for preparation of interlock pattern fabric. For example, zirconia felt or fiber, known under the tradename ZIRCAR ® which retains its fibrous nature at 2480° C., and its flexibility to around 1370° C.; ceramic fibers based on organometallic polymers known as TYRANNO FIBER ®, yielding a composition of silicon, titanium, carbon and oxygen, maintain fiber strength at 1300° C. Silicon nitride maintains high fiber strength after conditioning for 2 hrs at 1200° C., its typical bulk composition, by weight, is 59% silicon, 29% nitrogen, 10% carbon and 2% oxygen. It is fully amorphous and it has a nominal density 2.5 g/cm$^3$.

All of the aforementioned and other fibers, which can withstand high heat flux without changing thermal properties and which possess other properties such as break-strength, are lightweight and can be used as sewing thread. They are contemplated to be within the scope of this invention.

For successful fabrication of a very high temperature composite flexible blanket insulation, a high temperature sewing thread is necessary. This thread needs to possess the following properties: it must have the capability of being machine-sewn into a quilted blanket; it must survive high heating loads without any substantial damage; it must be light, strong and yet thin enough not to damage the radiation shields excessively and it should not break, kink, snarl, double or twist.

UTILITY

The CFBI of the current invention represents a substantial improvement over previously known insulations. It provides flexible, durable, lightweight, high-temperature resistant insulation suitable for repeated use. This invention utilizes currently known and available materials and processes in fabrication of these CFBI which have various configurations, various temperature and emittance parameters and consequently possess various properties. By combining fabrics and sewing threads having a resistance to high heat flux and high emissivity, high break strength and a low density, lightweight CFBI can be designed having desired thermal insulation capability from above 500° C. to about 1650° C.

The new CFBI has the potential to significantly reduce vehicle structural temperatures for a fixed insulation thickness, or alternatively, to allow the use of thinner blankets with a corresponding reduction in heat shield or thermal protection system weight. The new improved CFBI has an effective lower thermal conductivity and lower thermal diffusivity than state-of-the-art insulations, and thus is able to protect attached substructures from reaching a critical temperature with a minimum of weight and/or thickness.

Multilayer insulations consisting of alternating metal foils, preferably of honeycomb pattern and scrim cloth or aluminized polyamide film were evaluated for thermal performance. These composite flexible insulations were compared to those of previous CFBI. The merits of each insulation system were based on their thermal response or backface temperature increase as measured in a thermal diffusivity apparatus and by their density. The multilayer insulations containing aluminum were the most efficient systems, measuring up to fifty percent reduction in backface temperature increase when compared with the silica baseline insulation system, however, these composite insulations were slightly heavier than the baseline.

The composite flexible insulation of this invention as depicted in Table 4 consisting of aluminized polyamide film on one or both sides having flat or honeycomb pattern with silica insulation reaches a backface temperature of 110° C. at 15 min (2000 sec) when tested at 1.5 mm Hg pressure. The CFBI of prior art, of equivalent thickness and density, reaches a backface temperature of around 180° C. (Sample 4, FIG. 7) at 15 minutes while the same CFBI containing honeycomb Al Kapton had the same time the temperature around 60° C. (Sample 3, FIG. 7). Thus, there is clearly a much higher insulation capability of insulation containing the current improvements compared with CFBI of the prior art, without any weight penalty attached.

The effectiveness of the multilayer component increases as a function of overall thickness of insulation. The multilayer insulations of this invention were most effective in the 2.4 cm thick configuration.

The composite insulations containing the new features of this invention have multiple utility. First, they provide weight and space savings for aerospace vehicles, providing at the same time an excellent thermal insulation. These insulations, which are flexible, durable, thinner, and lightweight are equally useful for commercial aircraft, manufacture of firemen's suits, tools and equipment, in the steel molding industry, for thermal insulation of extreme temperature habitats, in space applications, furnaces, ovens, pools, boats and airplanes, cryogenic systems (such as fire extinguishing blankets), and for any other industrial use requiring high temperature insulation achieved with a lightweight material.

While only a few embodiments of the invention have been shown and described herein, it will become apparent to those skilled in the art that various modifications and changes can be made in the lightweight composite flexible blanket insulation and the method of producing the insulation described herein without departing from the spirit and scope of the present invention. There is every reason to believe that the weight and insulation efficiencies cited herein can be further improved upon with minor material modifications. All such modifications and changes coming within the scope of the appended claims are intended to be carried out thereby The following Examples are to be interpreted as descriptive and illustrative only. They are not to be construed as being limiting in any way.

EXAMPLE 1

FABRICATION OF COMPOSITE FLEXIBLE BLANKET INSULATION

The following procedure describes the fabrication of improved composite flexible blanket insulations with a variety of materials.

Depending on the exposure temperature of the blanket, outer mold line fabric material 40 was either silica, aluminoborosilicate, silicon carbide or silicon carbide having interlock design. For high temperature applications, the CFBI was constructed as follows: SiC type NLM 202, 15 harness satin weave with sizing type M, yarn count 48 warp×46 fill per inch, 200 filament 600 denier yarn, yarn construction ½ warp, ½ fill, fabric weight 8.4 oz/yd$^2$. These materials were obtained from Dow Corning, Midland, Mich.

The new carbide fabric (SiC-1) is the yarn Nicalon type NLM 202, size P, 600 denier, 200 filaments/tow. Fabric yarn count is 93/inch (warp)×87 inch (fill)±5%. Fabric width is 30.5 inch minimum; fabric weight is 15.7±5% oz/yd $\wedge$ 2; fabric thickness is 0.025 inch±10%; and weave type is interlock 3 ply as shown in FIG. 9. The fabric is manufactured by a processor known in the art. These materials form the top surface layer of the blanket exposed to the utmost heat.

Alternatively, the inner mold line fabric material was alumino-borosilicate known as NEXTEL 312, TYPE AF-9, yarn count 1259×1259 per meter 4 harness satin, 185 g. per sq. meter. NEXTEL was obtained from 3M Corp., St. Paul, Minn.

Alternatively, silicon carbide having an interlock design was at the top and bottom of the insulation blanket facing or being attached to the subject being insulated and thus formed the backface of the insulation. Optionally, it was also positioned between the insulation and multilayer area.

Insulation was generally positioned as a single silica layer just under the silicon carbide fabric and was made of fibrous high temperature insulation material obtained from Manville Corp., Denver, Colo. Insulation was Q-Fiber Felt, 6 lb/ft$^3$ heat cleaned at 1000° F. for 2 hours. Insulation conformed to the publicly available Rockwell Spec No. MBO 135–102, Type 1, Class 2.

Using the same manner of fabrication, insulation was interchangeably made of aluminoborosilicate NEXTEL 312 TM insulation, or alumina known as Saffil ®, available from Babcock & Wilcox, Augusta, Ga.

The multilayer area was made of alternating sheets of reflective shield foil and spacer or solely by reflective shield foil when the honeycomb pattern was used. There were between 9–30 layers of both materials or 9–30 reflective honeycomb foils.

The reflective shield foils were chosen from the following products generally available from Sheldahl, Inc.:

Aluminized Kapton TM, vacuum deposited aluminum on one side of 0.0003 inch Kapton, 0.007 g/in$^2$, flat or honeycomb patterned.

Aluminized Kapton TM vacuum deposited aluminum on both sides of 0.0003 inch Kapton, 0.007 g/in$^2$, flat or honeycomb patterned.

Aluminized Kapton TM vacuum deposited aluminum on both sides of 0.0003 inch Kapton with bonded ceramic scrim cloth (Orcon Corp.) 1 4 oz/yd$^2$. Vacuum deposited aluminum was 12 microns thick with a typical solar absorbance of 0.14 and typical room temperature emittance of 0.05, flat or honeycomb patterned.

The spacer, if used, was generally chosen from aluminoboro-silicate scrim, silica felt and/or polyamide film. Aluminoborosilicate scrim cloth was constructed from NEXTEL 312 yarn, 600 denier, 275×275 yarns/meter, 52 per sq. meter is obtained from 3M Corp. Silica felt was made of Astroquartz II TM material obtained from J. P. Stevens & Co., Inc. The polyamide film spacer was Kapton TM obtained from Sheldahl, Inc. Alternatively, the spacer was prepared from foil having a honeycomb pattern.

The multilayer area (MLA) was situated under the insulation and was sandwiched between insulation and backface fabric.

In the process of fabrication, these layers were placed on each other starting with silicon carbide fabric at the bottom, MLA made of alternating spacers with reflective shield foil positioned above the bottom fabric, MLA being optimally covered with one layer of fabric positioned between MLA and the insulation. The insulation was covered with a top fabric forming the extreme top surface.

All of these layers were sewn together using a ceramic thread 48 as seen in FIG. 2. Thread used at the top was chosen from the group of zirconia thread, TYRANNO FIBER ® thread, silica, ABS, silicon nitride or silicon carbide. These threads were made by the procedure described in the copending application 07/410,576 or were obtained from 3M, Nippon Corporation, Dow Corning or Fabric Development, Inc., with the following characteristics. Silicon carbide thread, 2 ply silicon carbide NICALON, NLM 202 constructed from 900 denier yarn, 3.1 2-twist per inch, served with Rayon/Dacron yarn. The bottom thread is the thread catching the top thread at the backface of the insulation. The bottom thread was ABS NEXTEL 312, type AT-21 obtained from 3M Company or SiC thread.

Sewing was done by using a heavy-duty multi-needle sewing machine available from Adler Corporation, Frankfurt, West Germany. The top needle was as thin as possible to minimize damage to the foils. Sewing, stitches, stitch count, stitch pattern stitch type, stitch spacing and closeout stitches conformed to federal standard FED-STD-751. Stitch count was five, plus or minus two stitches per inch. Stitch pattern was 2.5 cm by 2.5 cm (FIG. 20, view A—A of FIG. 17) alternating deep stitch (DS), view A–B, with a shallow superficial stitch (SSS) using stitch type 301 (FED-STD-751). In FIG. 2, the end of top thread loop is shown as it protrudes from the bottom surface.

The blanket has generally the following dimensions: the completed blanket thickness at the stitch lines was 0.68 inch minimum; the completed blanket thickness away from the stitch-lines was from 0.20 to 1.25, usually 0.89 inch plus or minus 0.08 inch; the platform dimensions were 24"×24". Other sizes, smaller or larger, can also be made in the same way. The completed blanket has not exceeded a pillowing allowance of 0.16 inch on the bottom side and 0.16 inch on the top side. The finished blanket was uniform in quality, clean and free from entrapped materials.

The preferred blanket of this invention was made up of the following components listed downwards from the top surface: (top) silicon carbide fabric (interlock); (insulation), (MLA) honeycomb foil (aluminized surface up), and scrim cloth, and bottom fabric. Foil and scrim cloth alternated with 10 of each foils and scrims, except in the case of CVD aluminum foil or honeycomb patterned foil or material where no scrim cloth was used.

The blanket was fabricated in two separate operations: (A) The top fabric, insulation, and bottom fabric was used to construct the blanket using a stitch spacing of 2 inches. The top and bottom thread used were silicon carbide and NEXTEL 312, respectively. The multilayer components and the bottom fabric were placed over the bottom of the prefabricated insulation and the entire blanket was resown. The completed blanket had a 1 inch square pattern on the top surface and a 2 inch square pattern on the bottom surface of the multilayer area as shown in FIG. 4.

Fabrication of the insulation blanket was done by quilting all of the layers together.

The quilting frame of appropriate size was prepared and one layer of MLA fabric was laid over the frame and one side was stapled to the wood frame. Cloth was stapled to each side of the frame. Care was taken not to stretch cloth because quilting gathered the cloth and previously stretched material would either rip the cloth or crack the frame. When the stapling is finished, the cloth should lay flat but not too tight.

The frame was turned and one layer of insulation was laid over and trimmed to the size of the frame. A reasonable flatness of the blanket was maintained throughout quilting. One layer of top fabric was stapled on the edge to the wood frame. The insulation blanket may extend above the thickness of the frame, which will cause the top cloth to pillow. The top loth may be pulled tight while stapling the other sides as the pillowing will provide the extra materials needed for quilting. The top cloth was then marked with the quilt pattern required. The same process was used for attaching bottom fabric.

Using the procedure described above, the insulation blankets of configurations summarized in Table 4 were fabricated.

EXAMPLE 2

Thermal Conductivity Measurements

The following procedure describes a testing of thermal conductivity measurements by the "guarded hot plate" technique. The procedure of the American Society for Testing and Materials C-177-85, known as "Steady-State Heat Flux Measurements and Thermal Transmission Properties by Means of the Guarded Hot Plate Apparatus", was modified to permit testing at low pressures and high temperatures. The modifications were as follows.

The guarded hot plate is an absolute measurement device whereby a controlled, precisely measured energy input is supplied to a specimen under minimized heat loss conditions. This is accomplished by sandwiching a heater between two similar test specimen discs. The heater is designed so that energy input to the heater versus time, that is, the power dissipated in the heater, flows approximately equally through each of the test specimens. The main heater design incorporates a separate annular automatically controlled guard heater, which is set to the temperature of the metering heater. Thus, energy will only flow axially through the test specimens, and not radially to the surroundings.

The actual instrument utilizes a 10 cm diameter (4 inches) main heater. The power input to this heater is determined by measuring the voltage drop across the heater leads and the current flow through the heater windings. The power input to the heater is created by a controlled DC power supply. The annular guard heater is separated from the main heater by a 3 mm gap and is 50 mm (2 inches) wide, making the entire heater assembly 200 mm diameter (8 inches). A multijunction thermopile is used to measure the temperature difference between the main and guard heater. The output of the thermopile is inputed to a temperature controller whose output drives the guard heater within 0.01 mV, differential with respect to the main heater.

Two additional heaters, termed the top and bottom auxiliaries, are used to create the desired temperature level of a test point. These heaters are close-loop controlled by thermocouples in the heater plates by automatic temperature controllers.

The auxiliaries, main/guard assembly and specimens are placed between fluid cooled copper heat sinks which create a load on the heaters allowing precise temperature control. An environmental heating unit (outer guard heater) is placed around the test stack and set at the mean sample temperature using a similar feedback control system as the auxiliary controllers. Finally, a shroud is placed concentrically around the test stack and the interfaces between the test stack, the environmental heating unit and the shroud are filled with a low conductivity loose-fill insulation material.

Temperatures at all critical points in the system were measured with calibrated no. 30 AWG Type K thermocouples, recorded to ± microvolt using a digital microvolt meter.

The tests were conducted by creating an approximate 28° K. (50° F.) temperature difference across each sample. Typically, the auxiliary controllers (cold face surfaces) were set 4° K. below the mean temperature desired, and the main heater (hot face surfaces) 14° K. above, using the DC power supply. At equilibrium conditions, established when 5 successive sets of readings produced a final result which did not change by more than 1%, a final set of data was taken and reduced.

The apparent thermal conductivity was calculated from the following equation $$\lambda = (q)(\Delta x)/(A)(\Delta T)$$

and the thermal resistance calculated from the equation $$R = (q/A)^{-1} \Delta T$$

where:

$\lambda$ = apparent thermal conductivity, W/m-k; (BTU in/hr sq. ft F);

q = power dissipation in the main heater, W;(Btu/hr);

$\Delta X$ = total thickness of both test specimens, m;(inches);

A = the metering surface area taken twice, sq.m; (sq. ft);

$\Delta T$ = the total temperature difference across both specimens, C; (F); and R = thermal resistance, $m^2$ K.

Samples were evaluated at pressures of 1 ATM, 0.1 ATM, and 0.01 ATM at each test temperature. The samples were tested in ascending temperature order, with all three pressure conditions evaluated prior to the test apparatus being brought up to the next higher temperature.

Nitrogen gas was used as the cover gas, in an attempt to protect the specimens and the test equipment from oxidation.

EXAMPLE 3

Absorbance Testing

Testing for absorbance, designated as "α" in the specification and Figures, is performed as follows.

Solar absorbance testing is done with a dual beam, ratio recording Beckman Dk-2A UV-VIS-NIR spectrophotometer. The beam of light is incident at 5 degrees from normal. The reflected light is scattered into a 6-inch diameter integrating sphere and detected by either a lead-sulfide cell or a photomultiplier tube. The recorded reflectance data is expressed as a percentage of a working standard's reflectance. The working standards are calibrated against an NBS specular reflectance standard. Data from 280 nanometers to 2500 nanometers are recorded. This method equates to ASTM E308.

EXAMPLE 4

Emittance Testing

Testing for emittance, designated as "ε" in the specification and Figures, was performed in the following manner. Certified room temperature testing was done in two different ways.

A good approximation to total hemispherical emittance was obtained from a Lion Research Corporation emissometer. This instrument responds to the IR energy emitted from a sample through a Potassium Bromide window into the detector. The wavelength range is 3-30 microns. This method equates to ASTM E408, Method B.

The normal emittance of a sample can also be measured with a Gier-Dunkle DB100 infrared reflectometer. This instrument's detector also utilizes a potassium bromide window. The wavelength range is 5-25 microns. This method equates to ASTM E408, Method A. Both machines are calibrated with a certified standard supplied by Gier-Dunkle.

EXAMPLE 5

Determination of Absorbance and Emittance in One and Two Sided Aluminized Kapton Honeycomb This example illustrates the determination of absorbance and emittance of Kapton aluminized on one side and on both sides.

Description

Sample 1: Kapton, Aluminized Two Sides
800Å Vacuum deposited aluminum×0.3 mil Kapton×vacuum deposited aluminum;
Sample 2: Kapton, Aluminized One Side
Vacuum deposited aluminum Al/Kapton×0.3 mil Kapton 800Å;
Maximum Temperature: 600° F.

Using the method for measurement of absorbance and emittance as described in Examples 4 and 5, the absorbance and emittance were determined for Samples 1 and 2.

EXAMPLE 6

Determination of Emittance Emissivity of Silicon Carbide Fabric

This example illustrates the determination of emittance emissivity of the newly designed interlock on silicon carbide fabric.

Two different methods were used to measure the emissivity values for the original (SiC-2) and new design (SiC-1) fabrics. The first method consists of a concentric cylinder system. The fabric was applied to the outer surface of the inner cylinder and equipped with surface thermocouples for instrumentation. A high temperature electric heater was located inside the inner cylinder, supplying the heat transferred in the system. The inner cylinder was surrounded by a larger diameter, second cylinder whose surface temperatures were also measured with attached thermocouples. A third, still larger diameter cylinder, surrounded the second cylinder completing the concentric system. This was then positioned under a stainless steel bell jar where a high vacuum could be created. The electrically-generated heat emitted by the central heater was monitored with a volt meter and an ammeter. A pressure gauge indicated the vacuum level that existed in the test system during the run.

The fundamental equations relating the interreflection radiant energy transfer and the emissivities are given by the following equation:

$$G = \epsilon\sigma\left(\frac{a^2}{a^2 + b^2}\right)T_1^4$$

where:

σ is Stephan Boltzmann constant;
ε1 is gray body emissivity of inner cylinder surface test fabric;
ε is gray body emissivity of surrounding cylinder surface; $T_1$ is absolute surface temperature of inner cylinder surface test fabric;
$T_2$ is absolute temperature of surrounding cylinder surface;
$A_1$ is radiating area of inner cylinder; and
$A_2$ is radiating of surrounding cylinder.

The radiation flux (q/A) rad was calculated from the heat output of the electric heater and corrected with a hard vacuum gas conduction term.

The second emissivity test system consisted of a ceramic cup whose bottom could be fitted with samples of test fabrics. The fabric surface temperatures were measured by fine gauge thermocouples threaded into the fibers. The 2-inch diameter cup was oriented in a horizontal position so that the flames from an oxyacetylene torch could play into the open end of the cup. At a fixed distance from the surface of the cup (13 inches), a vertical heat flux transducer was positioned so that the radiant flux from the 2 inch diameter disk of test fabric could be measured. The heat flux transducer was very

TABLE 5

| Sample | α | ε | Typical α/ε | Temp. Range Intermittent °F. | Temp. Range Continuous °F. | Adhesion to Al. oz/incl. of width ASTM 1000 | Approx. Weight gms/in² |
|---|---|---|---|---|---|---|---|
| 1 | ≦0.14 | ≦0.05 | 4.0 | −420 to 550 | — | 0.007 | |
| 2 | ≧0.14 | ≧0.05 | 4.0 | −420 to 550 | — | 0.007 | | thin and had previously been accurately calibrated. By measuring the diameter of the hot fabric disk and its distance from the heat meter (which were normally aligned), the radiation factor was determined. The equation used to relate the emissivity to the measured radiant energy is given by:

$$\left(\frac{q}{A}\right)_{rad} = \frac{\sigma}{\frac{1}{\epsilon_1} + \frac{A_1}{A_2}\left(\frac{1}{\epsilon_2} - 1\right)} [T_1^4 - T_2^4]$$

where

G is radiant flux falling on radiometer, BTU/hr ft$^2$;

$\epsilon$ is gray body emissivity of the fabric surface;

$\sigma$ is Stephan-Boltzmann constant, $0.1714 \times 10^{-8}$ BTU/hr ft$^2 °R^4$;

a is radius of fabric disk;

b is distance radiating surface of fabric disk and the heat. Meter (radiometer)

$T_f$ is temperature of the fabric disk in °F;

$a^2/a^2+b^2$ is angle factor for the radiation system.

Using methods described above, the emissivity of the newly designed fabric SiC-1 having an interlock design was compared to the original silicon carbide fabric SiC-2.

We claim:

1. A composite multilayered flexible blanket insulation comprising a woven fabric having stacked multi-layers of silicon carbide fill yarns wherein each silicon carbide fill yarn layer is interwoven with another silicon carbide fill yarn layer in an interlock pattern by a warp yarn.

2. The blanket insulation of claim 1 wherein the woven fabric is used on the surface of the blanket insulation.

3. The blanket insulation of claim 2 wherein the woven fabric consists of at least three interlocked layers of silicon carbide fill yarn layers to provide interstructures having a high emissivity.

4. The blanket insulation of claim 3 wherein the woven fabric is made of silicon carbide yarn, 600 denier, 200 filament per tow, and wherein the fabric yarn count is from 88 to 98 per inch for warp and 83 to 91 per inch for fill.

5. The blanket insulation of claim 4 wherein the weight of the woven fabric is from 15 to 16.4 ounces per yard and the thickness of the fabric is between 0.022 and 0.027 of an inch.

6. The blanket insulation of claim 5 wherein the interlocked layer of silicon carbide fill yarn is a three-ply silicon carbide yarn interlocked in a pattern of interweaving one ply with the second and third plies.

7. The blanket insulation of claim 6 wherein at 1800° F. the woven fabric has an emittance around 0.712.

8. The blanket insulation of claim 7 additonally comprising a multilayer of sheets having a honeycomb pattern.

9. The blanket insulation of claim 8 wherein the honeycomb pattern sheets are made of polyimide film aluminized on both sides.

10. The blanket insulation of claim 9 wherein the honeycomb pattern sheets are made of polyimide film aluminized on one side.

11. The blanket insulation of claim 10 wherein there are nine to thirty honeycomb sheets in the multilayer.

12. A composite multilayered flexible blanket insulation comprising a top layer of a woven fabric having stacked multi-layers of silicon carbide fill yarns wherein each silicon carbide fill yarn layer is interwoven with another silicon carbide fill yarn layer in an interlock pattern by a warp yarn, an insulation layer, a multilayer made of sheets having a honeycomb pattern, and a bottom layer.

13. The blanket insulation of claim 12 wherein the honeycomb pattern sheets are made of an aluminum foil or vacuum deposited aluminum or gold on polyimide film and wherein the aluminum or gold is deposited on one side or on both sides of the polyimide film.

14. the blanket insulation of claim 13 wherein there are between nine and thirty honeycomb pattern sheets in the multilayer.

15. The blanket insulation of claim 14 wherein the bottom layer is made of silica or aluminoborosilicate.

16. The blanket of claim 15 wherein the insulation layer is made of silica, aluminoborosilicate or aluminai 17. The blanket insulation of claim 15 wherein the woven fabric consists of at least three interlocked layers of silicon carbide fill yarn, 600 denier, 200 filament per tow, and wherein the yarn count is from 88 to 98 per inch for warp and 83 to 91 per inch for fill.

18. The blanket insulation of claim 17 wherein the weight of the woven fabric is from 15 to 16.4 ounces per yard and the thickness of the fabric is between 0.022 and 0.027 of an inch.

19. The blanket insulation of claim 18 wherein the fabric is woven with an interlock three ply weave.

* * * * *